(12) United States Patent
Holder

(10) Patent No.: US 12,398,971 B1
(45) Date of Patent: Aug. 26, 2025

(54) LOW PROFILE FIREARM WALL MOUNT

(71) Applicant: InnoWorkz LLC, Cranberry Township, PA (US)

(72) Inventor: Benjamin Holder, Cranberry Township (UA)

(73) Assignee: Inno Workz, LLC

( * ) Notice: Subject to any disclaimer, the term of this patent is extended or adjusted under 35 U.S.C. 154(b) by 21 days.

(21) Appl. No.: 18/397,100

(22) Filed: Dec. 27, 2023

Related U.S. Application Data

(60) Provisional application No. 63/487,503, filed on Feb. 28, 2023.

(51) Int. Cl.
*F41A 23/18* (2006.01)
*F16M 13/02* (2006.01)

(52) U.S. Cl.
CPC ............ *F41A 23/18* (2013.01); *F16M 13/02* (2013.01)

(58) Field of Classification Search
CPC ................................ F41A 23/18; F16M 13/02
USPC ...................... 248/304, 301; 42/94; 89/37.01
See application file for complete search history.

(56) References Cited

U.S. PATENT DOCUMENTS

| 5,934,112 A * | 8/1999 | Rice ......................... F41A 23/18 211/8 |
| 11,796,273 B2 * | 10/2023 | Barnes ..................... F41A 23/16 |
| 2023/0258426 A1 * | 8/2023 | Johannes .................. B60R 7/14 211/64 |

* cited by examiner

*Primary Examiner* — Todd M Epps
(74) *Attorney, Agent, or Firm* — Karen Tang-Wai Sutton

(57) ABSTRACT

A low profile firearm wall mount providing convenient storage and retrieval of a firearm having a protruding lip around a perimeter of a magazine well of the firearm. The wall mount has a body with a slot formed therein, the slot further comprised a slot opening, and a back, floor, and front walls having at least one channel inscribed therein, the channel adapted to slidably receive the protruding lip accessible from the slot opening. In a method of use, when the slot opening is oriented upwards, the firearm is positioned above the mount. When the slot opening is oriented sideways left or right, the firearm horizontally engages or disengages the slot. By customizing the channel to a profile of the protruding lip, the wall mount is adapted to receive an AR 15 rifle, pistols, or any type of firearm with a magazine well and protruding lip.

17 Claims, 13 Drawing Sheets

SECTION A-A

LOW PROFILE FIREARM WALL MOUNT

CROSS-REFERENCE TO RELATED APPLICATIONS

This application claims priority from U.S. provisional application Ser. No. 63/487,503 filed on 28 Feb. 2023, whose disclosure hereby incorporated by this reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of wall mounts for supporting and displaying firearms.

Background Art

Firearms are not just utilitarian devices but are equally admired as mechanical works of art. Many owners prefer to display their firearms rather than store them in a wall safe. Owners ideally are looking for firearm storage that is (1) easy to install; (2) secure yet allows easy retrieval/storage of the firearm; and (3) visually minimizes the look of the mounting hardware to allow the firearm itself to be the highlight of the display.

Current mounting hardware fails on all three points. Most mounts are time consuming or difficult to install, either allow easy access or secure mounting, but rarely both, and visually are bulky and/or unsightly. Owners have two main types of firearm mount hardware choices: (1) individual hooks screwed directly into the wall; or (2) rail or wall systems that are mounted to the wall that removably receive mounting hardware. Individual hooks are easy to use and inexpensive, with the advantage of allowing a firearm to be displayed individually on a wall with other items, above a fireplace mantle or doorway, or any other desired location, with the tradeoff that hook mounting necessarily requires at least two points of support for the firearm for stable support of the firearm, and with each hook typically at least two holes per hook to be drilled into the wall, the wall sustains damage from all the hooks. Hook mounting also requires the firearm to be supported horizontally, which limits mounting locations. Creating level mountings requires measuring and leveling skills too that can be frustrating or time consuming.

Wall mounting systems, such as pegboard, traditional vertically arranged gun racks, and rail/channel systems are comprised of hooks screwed directly into walls or mounted to rail systems that are first installed onto the wall and then the hooks slide into channel or rail systems that are mounted to the wall. They are easier to install and thus more forgiving in terms of measuring, allowing for more uniform installations, and are especially useful when multiple firearms are to be displayed. The main drawback of these systems is that the wall mounted portion of the system dictates the spacing of the firearms and can result in wasted space due to the built-in constraints of the system and may be too large for tight or unusually shaped spaces. Wall mount systems are typically only good solutions for owners with multiple firearms who wish to create a "wall of firearms" in one location and the wall mounted system has the advantage of the wall itself distracting from visuals of the mounting hardware. Wall mounted systems also generally still require two points of support for each firearm, and may include pairs of hooks, or hook and shelf units where the butt of the firearm rests on the shelf unit and the upper end is supported by a loop, hook, or bar. Vertically supported firearms often support the butt of the firearm on a shelf, which does not harm the firearm but due to the sloped end of the butt, the firearms are usually supported with a trigger side facing outwards, which tends to minimize the visual profile of the firearm. The mounting hardware can be painted to blend in with the wall portion of the system. While attractive, these systems take up significant wall space and thus are not suitable for smaller or irregularly sized and shaped custom displays or walls that have mixed display use, such as firearms with hunting trophies, photographs, and the like and are the most expensive option for the owner.

One of the main detractors of current firearm mounting systems is the ease of storage and retrieval of the firearm. Wall systems do a better job of minimizing the look of the mounting hardware, but the hardware is still visible, and with two points of support, it is less easy to remove the firearm from the display without knocking other firearms that might be in the way. Most require some vertical space between the firearm displayed and a next firearm displayed above it, because the hooks and current mounts require the firearm to be lifted vertically first to remove it from the mount. Thus, the vertical space requirement can be inconvenient, particularly when there are space limitations. An owner who wants to display many firearms together or mixed with other items on the wall must always include extra vertical space to allow the firearm to be retrieved, and this extra spacing typically must be duplicated across the entire wall display for visual special harmony. This again is a nuisance for an owner with limited wall space and deters the grab and go freedom many owners would like to have with their firearms. Wall systems in particular, due to their specific rail placement, can have significant wasted space once vertical space is incorporated into the display.

Physical limitations of owners are also not addressed by these systems: owners must be able to lift and then remove the firearm, and thus a wall display on a 10 foot wall will now require a ladder to retrieve or store the firearm, or conversely, require the owner to kneel or stoop down to retrieve or store the firearm. Complex displays that do not allow for easy removal and storage of the firearm are often abandoned because they do not serve the needs of the owner. Ergonomic options currently do not exist.

Equally important is that some current mounting systems do not allow a loaded firearm to be displayed securely and yet be easily accessible or allow an unloaded magazine to be stored installed directly into a displayed firearm. Safety concerns prompt many owners to store magazines and firearms separately, but in the event of an emergency, such separate storage and thus retrieval adds seconds or minutes in emergency situations, defeating a "grab and go" system desired by many owners with their display system.

What is needed is a wall mount with a single point of support for a firearm that securely mounts the firearm to the wall and allows for easy retrieval. What is also needed is a firearm mount that minimizes the visual look of the mount to emphasize the visual attractiveness of the firearm. What is also needed is a minimalist wall mount that can store a firearm and magazine in a ready to use mode, instead of storing the firearm and magazine separately. What is also needed is a wall mount that provides storage and retrieval flexibility that considers space limitations. What is finally needed is a wall mount that provides the owner flexibility in the mounting orientation of the mount, to allow vertical or horizontal display of the firearm or vertical or horizonal storage and retrieval of the firearm, as needed or desired.

DISCLOSURE OF INVENTION

A wall mount for receiving a protruding lip formed along an exterior perimeter of an opening of a magazine well of a firearm, comprising a body having a U-shaped slot defined by a slot back wall, a slot floor, and a slot front wall having a channel inscribed therein. The U-shaped slot is further comprised of an opening sized and shaped to receive a front side of the magazine well of the firearm, and the protruding lip of the magazine well is positioned inside the channel when the magazine well of the firearm is positioned inside the slot. The wall mount is adaptable for a number of different firearms, including an Armalite 15 rifle and a pistol. The body is made of plastic.

In a first aspect of the invention, the wall mount has an elongated back face on a wall adjacent side of the body, the back face formed with an aperture sized and shaped to receive a threaded fastener for mounting the body to a wall surface. The wall mount is oriented either with the slot opening facing upwards or sideways, providing two different mounting options for the firearm.

In a second aspect of the invention, the body is comprised of a shoulder portion joining an upper wall end of the slot back wall to the back face.

In a third aspect of the invention, the body is further comprised of a bottom having a first end and a second end, and the slot front wall is further comprised of an opposed front face, where the back face adjoins the bottom at the first end and the second end extends away from the first end and angles upwards adjoining a lowermost end of the front face.

In a fourth aspect of the invention, the U-shaped slot is further comprised of a left channel and a right channel inscribed therein, disposed in parallel but divergent arrangement along the slot back wall and the slot front wall, and in parallel arrangement along the slot floor. The protruding lip of the magazine well is positioned inside either the right channel or the left channel when the firearm engages the wall mount, depending on a left-right orientation of the magazine well. The left channel or the right channel has a concave profile adapted to slideably mate with the protruding lip. Either the left channel, the right channel, or both the left and right channels may be continuous across the slot back wall, the slot floor, and the slot front wall.

In yet another aspect of the invention, a method of mounting a firearm with a protruding lip formed along an exterior perimeter of an opening of a magazine well of a firearm to a wall surface using a wall mount having a U-shaped slot inscribed therein with a pair of parallel but divergent channels sized and shaped to receive the protruding lip and an opening of the U-shaped slot sized and shaped to receive the magazine well, comprises the steps of orienting the opening of the U-shaped slot of the wall mount so as to face either upwards or sideways, fastening the wall mount to the wall surface, orienting a front of the magazine well towards the opening of the U-shaped slot, and sliding the protruding lip into one of the channels of the pair of channels.

In still yet another aspect of the method of the invention, the pair of channels are further comprised of a left channel and a right channel, and the step of orienting the opening is further comprised of orienting the opening of the U-shaped slot towards a right side, and wherein the step of sliding is further comprised of sliding the protruding lip into the left channel. In yet another step, during the step of orienting the opening, when the opening of the U-shaped slot is towards a left side, the step of sliding is further comprised of sliding the protruding lip into the right channel.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
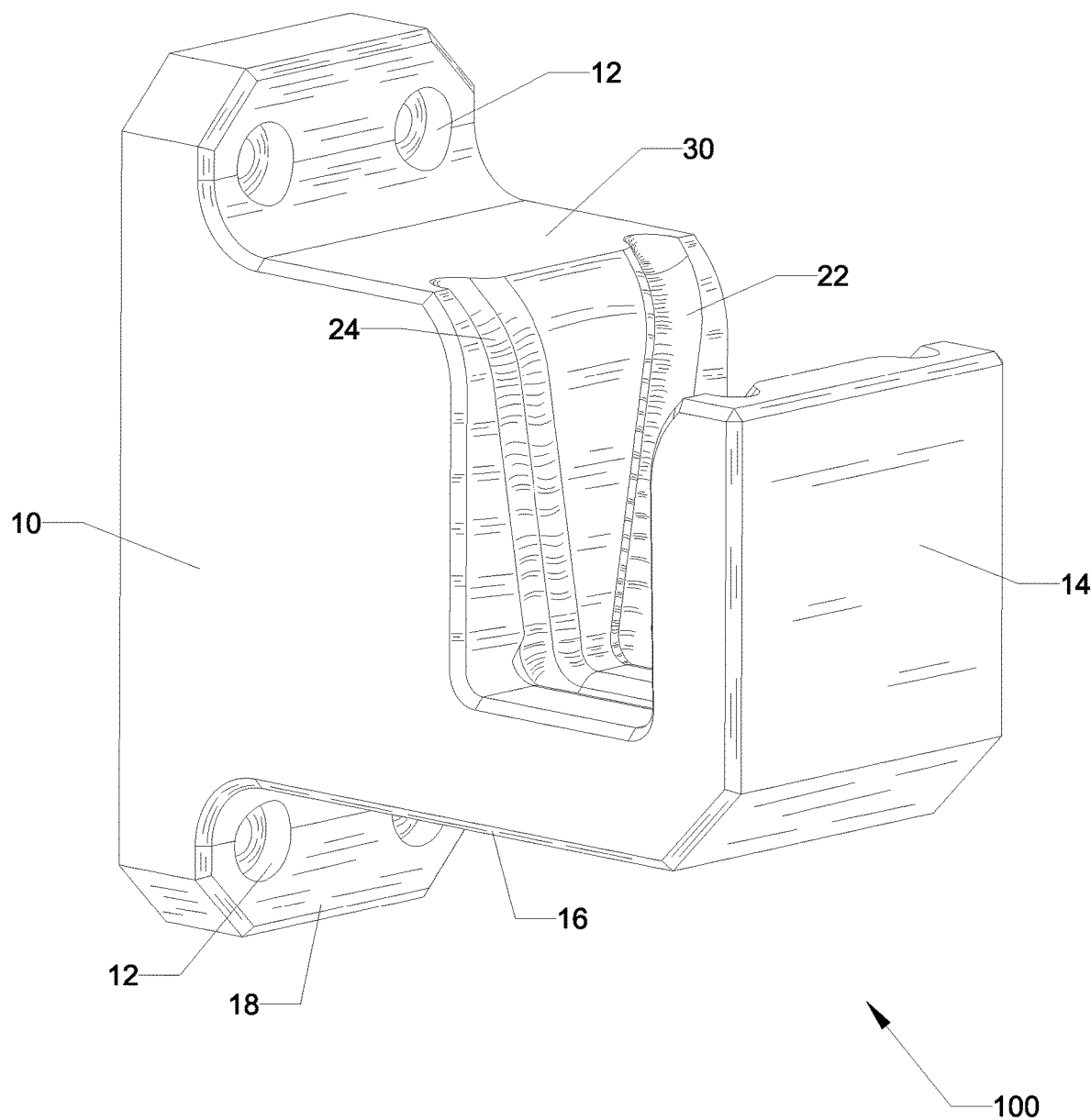
FIG. 1 is a perspective view of a firearm mount or mount according to the invention.

The following is a list of reference labels used in the drawings to label components of different embodiments of the invention, and the names of the indicated components.

100 low profile magazine well mount or mount
10 body of magwell mount
12 aperture
14 front face
16 bottom
18 back face
20 slot
22 right channel
24 left channel
26 slot back wall
28 slot front wall
30 shoulder
32 fastener
34 slot side
36 logo or identifier
38 slot floor
40 firearm
42 lip of firearm or lip
44 magazine well or magwell
44a front side of magazine well
46 magazine

DETAILED DESCRIPTION

A low profile mount according to the invention or mount 100 is shown in the accompanying FIGS. 1-13 as a unitary body 10 with a U-shaped slot 20 defined by a slot back wall 26, a slot floor 38, and a slot front wall 28, the slot 20 sized and shaped to receive a magazine well or magwell 44 of a firearm 40 having a protruding lip 42 around a perimeter of the magwell 44. In the presentative embodiment shown in the FIGS., the mount 100 is adapted to mount an ArmaLite Rifle or AR-15 to a wall surface. The inventor notes that the mount 100 can be adapted for use with any other rifle with a detachable magazine having the protruding lip 42, and thus the AR-15 rifle shown in the FIGS. is not meant to limit the term "firearm" used in this disclosure to AR-15 rifles but is mean to be more expansive and include pistols, other types of rifles, and other firearms having a magazine and a protruding lip.

Figure 3:
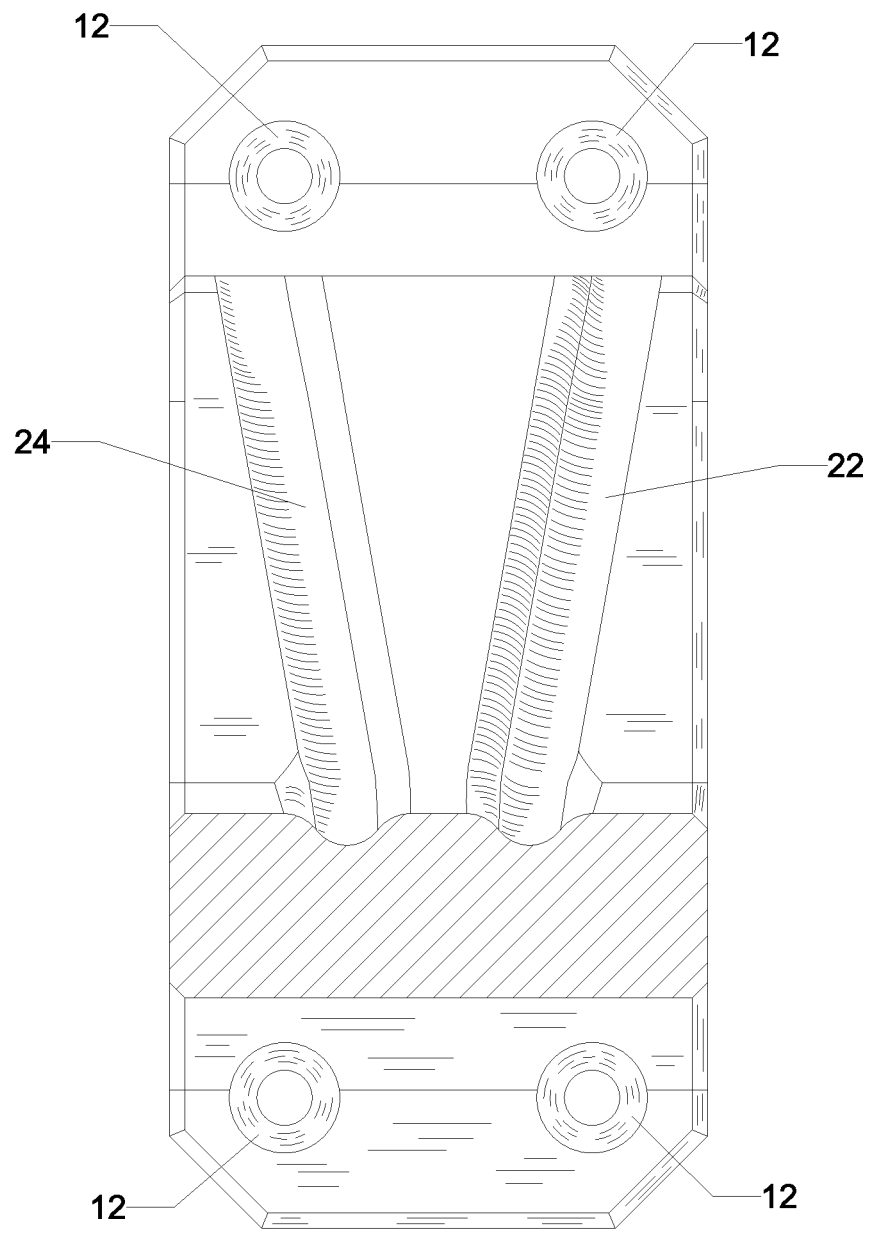
FIG. 3 is a sectional view of the mount in FIG. 2 taken along section lines A-A.
Figure 4:
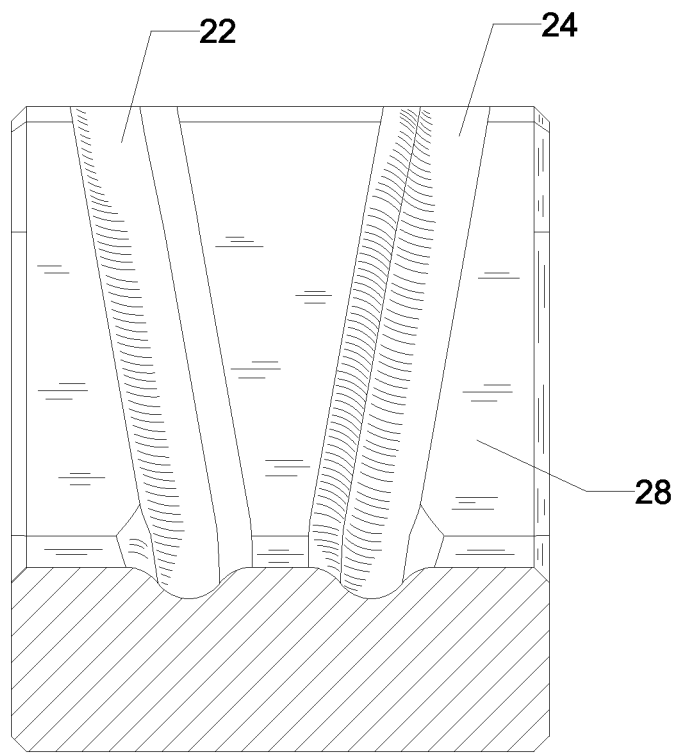
FIG. 4 is a sectional view of the mount in FIG. 2 taken along section lines B-B. 1.
Figure 5:
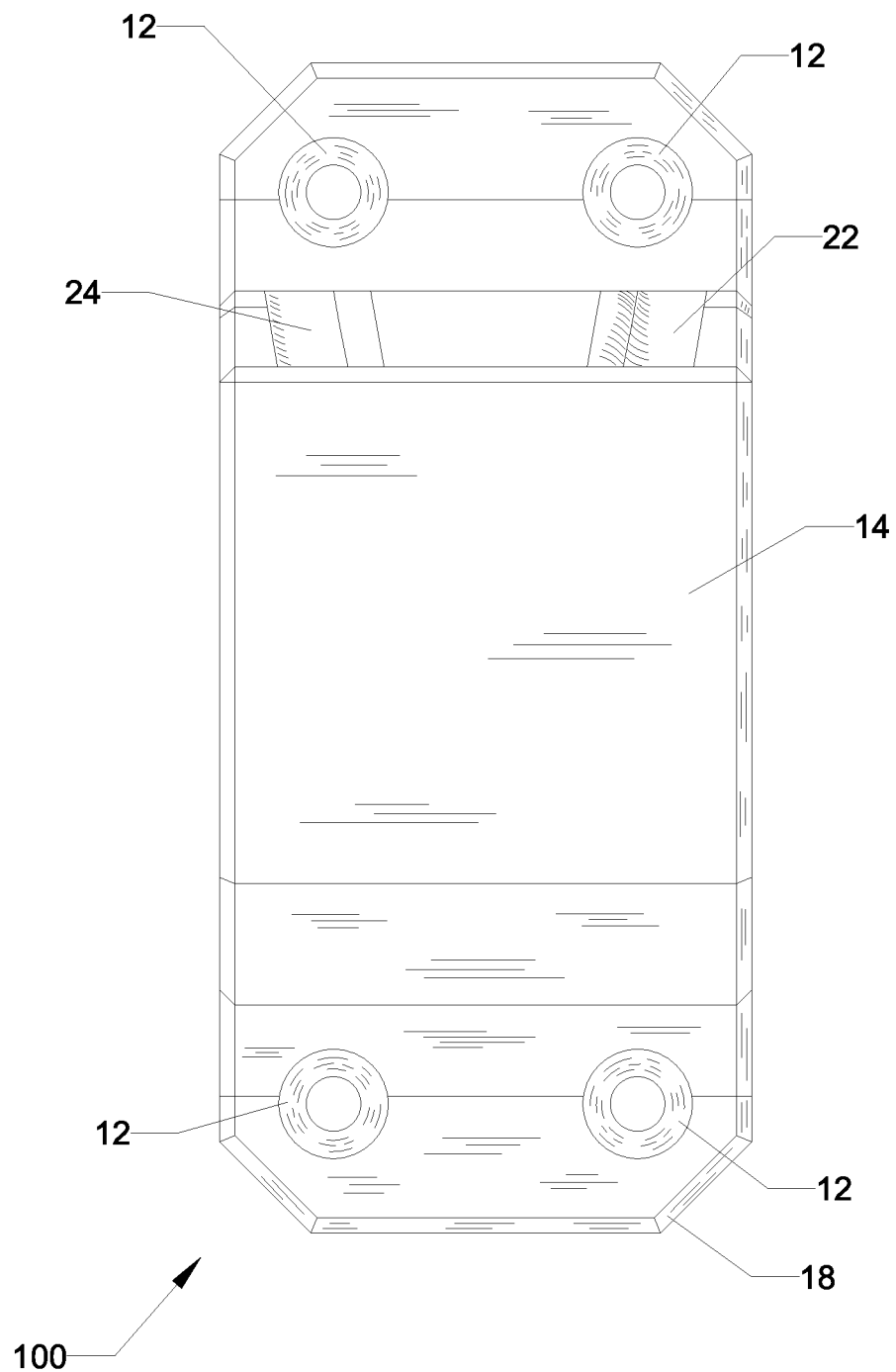
FIG. 5 is a front elevation view of the mount in FIG.
Figure 6:
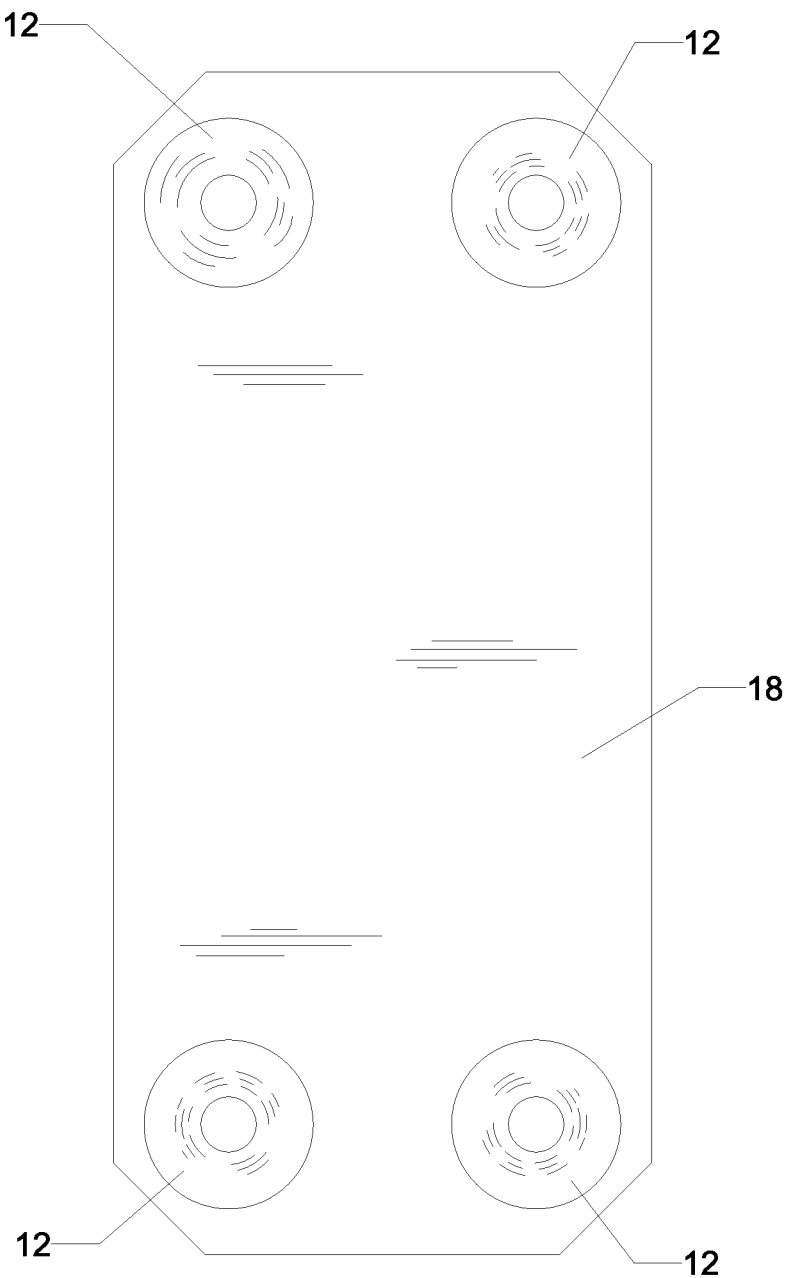
FIG. 6 is a back elevation view of the mount in FIG. 1.
Figure 7:
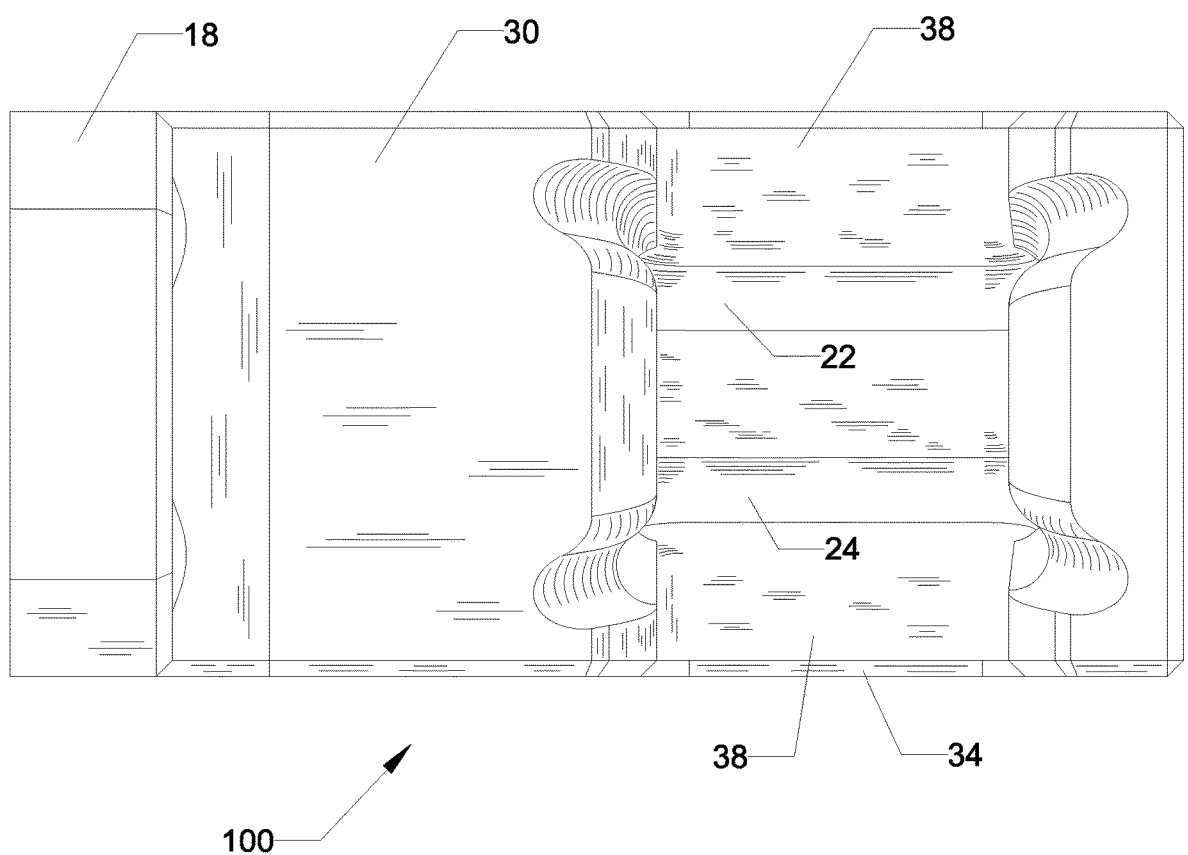
FIG. 7 is a top view of the mount in FIG. 1.
Figure 8:
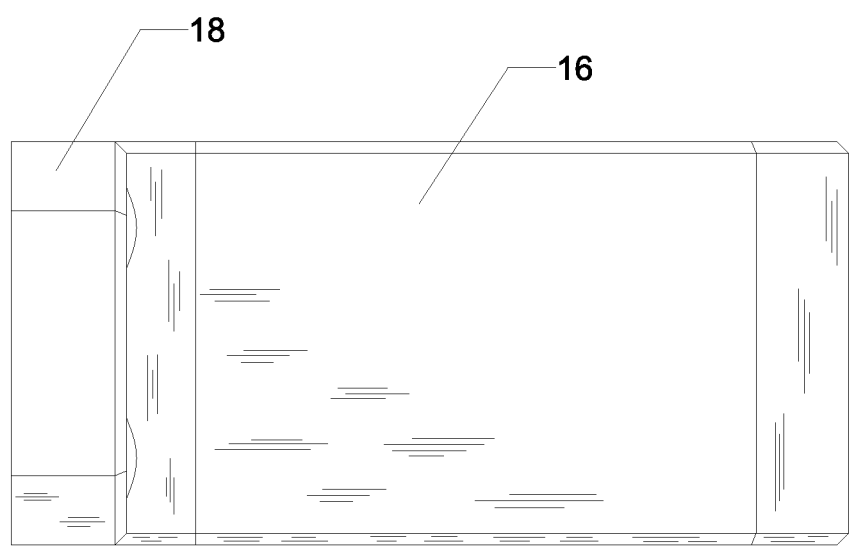
FIG. 8 is a bottom view of the mount in FIG. 1.
Figure 9:
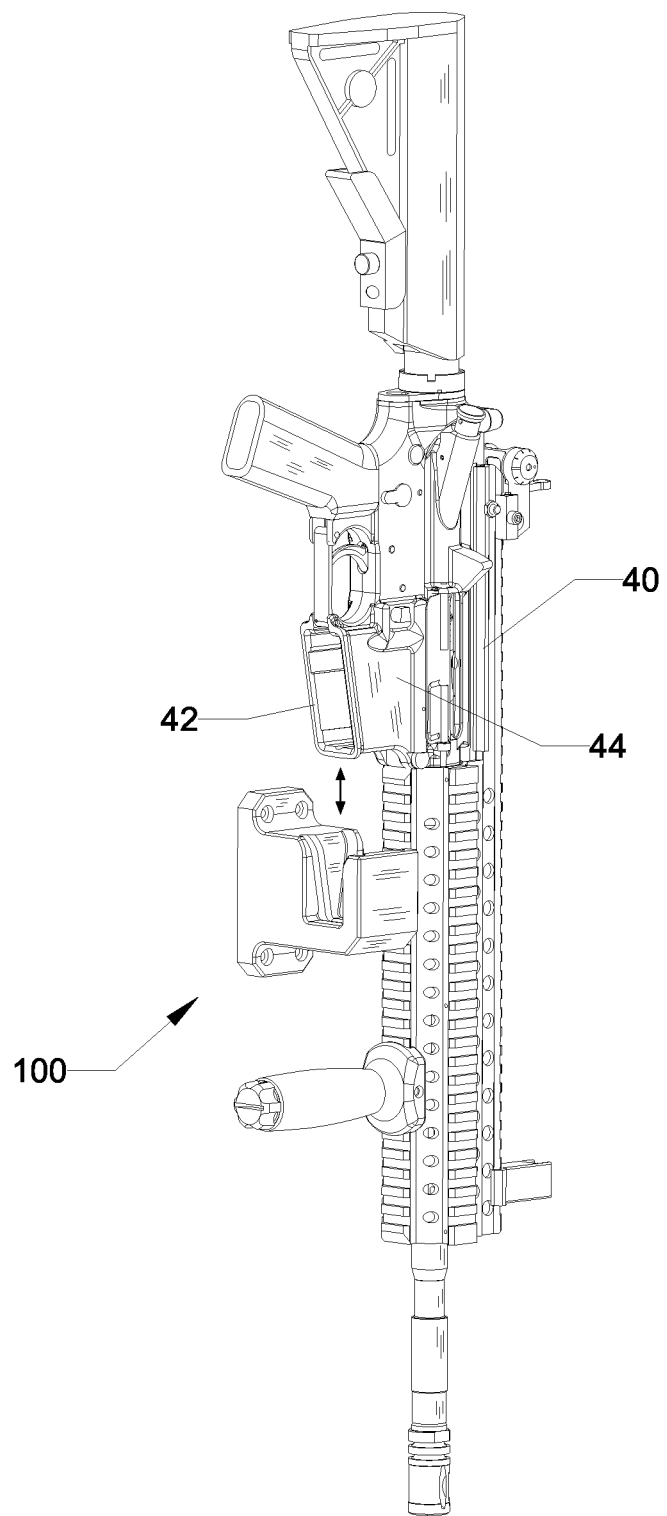
FIG. 9 is a partial exploded view of the mount with a representative AR-15 firearm shown above the mount in a pre-engagement position.

Turning to FIGS. 3, 4, and 7, the slot back wall 26, the slot floor 38, and the slot front wall 28 are inscribed therein with a pair of grooves or channels 22 24 sized and shaped to receive the lip 42 of the magwell 44. In the embodiment shown in the FIGS., the channels 22 24 are continuous across the slot back wall 26, slot floor 38, and slot front wall 28 such that each channel 22 24 is a continuous groove inscribed into the slot 20. The pair of channels 22 24 have an approximately concave profile matching a profile of the lip 42 and are disposed in parallel but diverging arrangement along the slot back wall 26 and the slot front wall 28 and in parallel arrangement along the slot floor 38.

Figure 10:
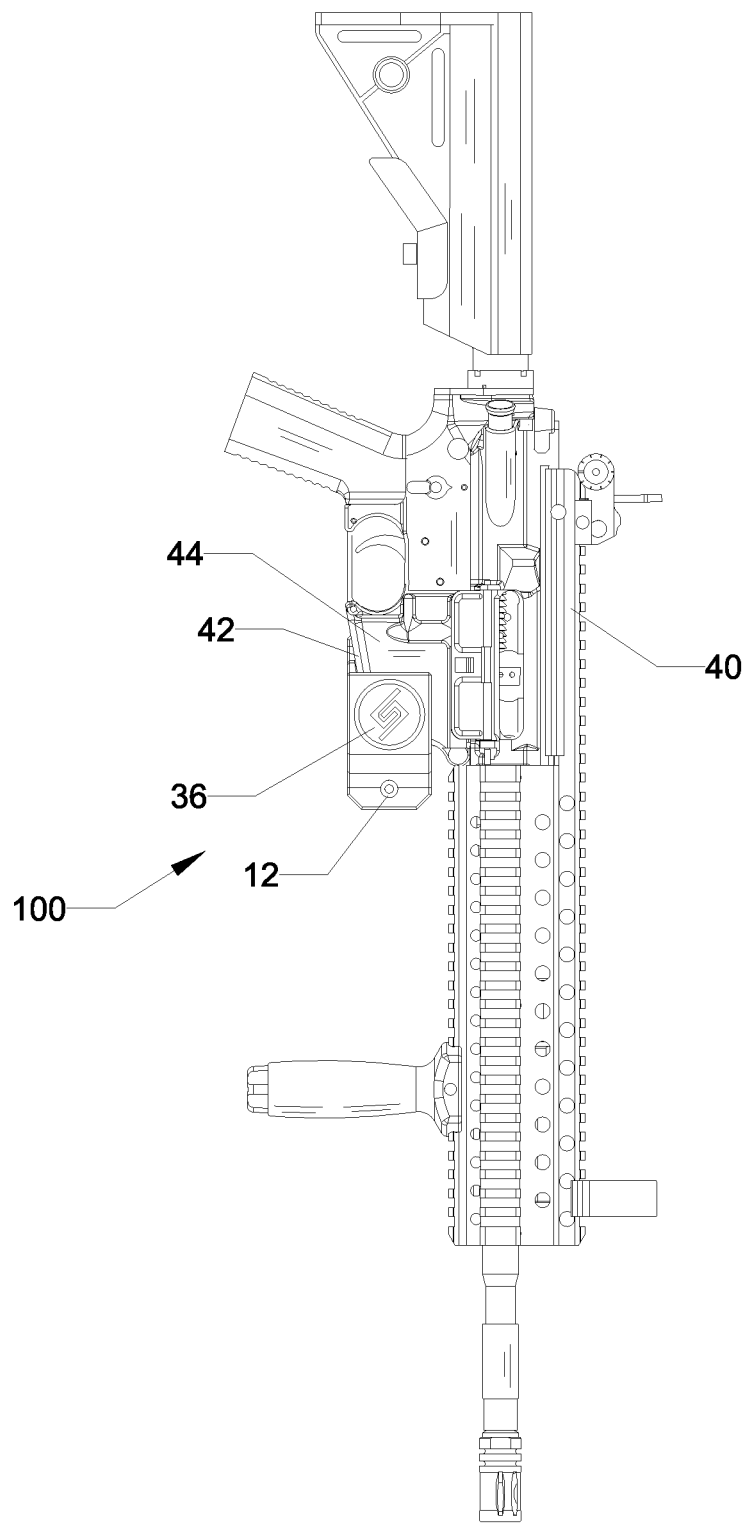
FIG. 10 is a front view of another embodiment of the mount, shown with a single wall mounting aperture on a lower end of the mount, and a logo on a front face of the mount, shown with the AR-15 in FIG. 9 supported by the mount with the lip of the magwell engaging a left channel of the mount with an opening of the magwell facing towards a left side of the mount.
Figure 11:
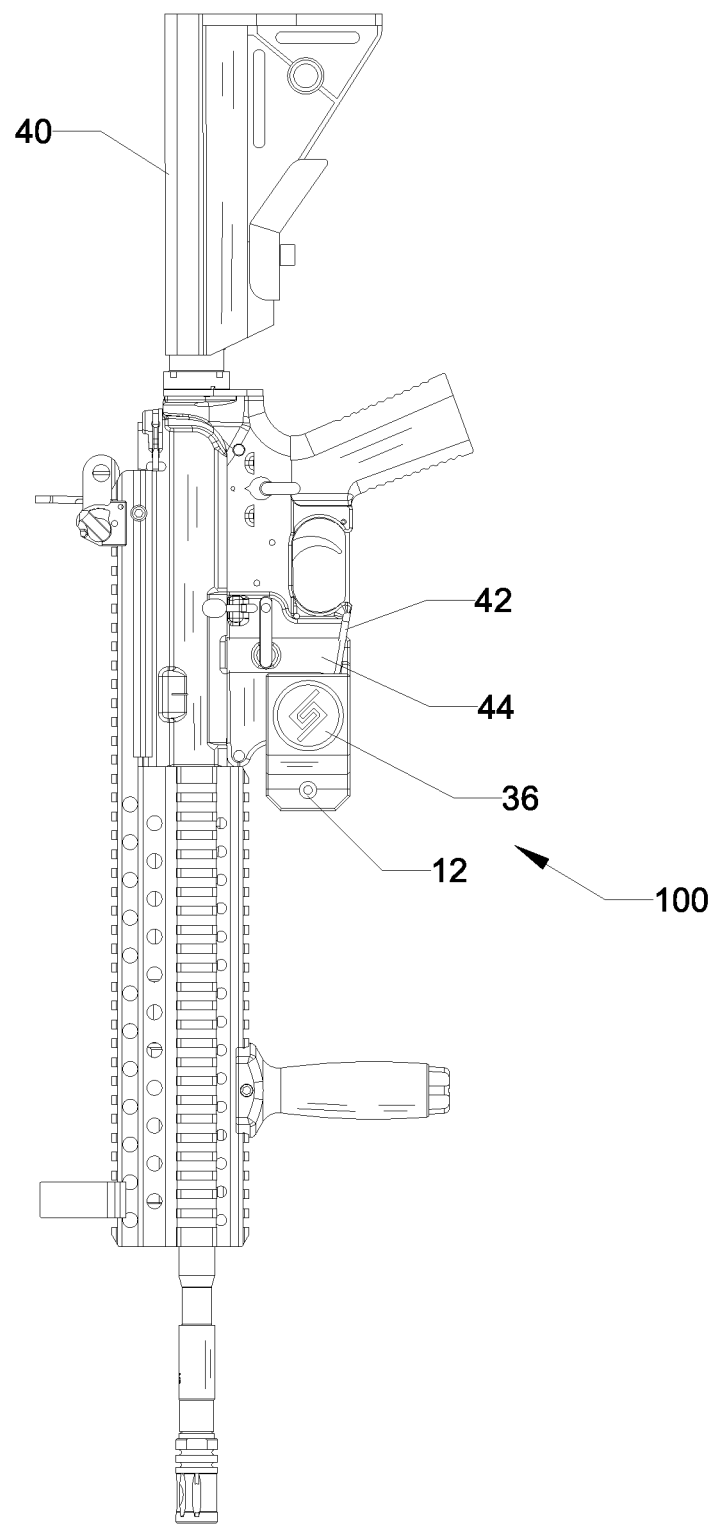
FIG. 11 is a second front view of the mount and firearm in FIG. 10, shown with the lip of the magwell engaging a right channel of the mount, with the opening of the magwell facing towards a right side of the mount.

The pair of channels 22 24 are further divided in to a left channel 24 and a right channel 22, so as to allow the lip 42 of the firearm 40 to engage either the right or left channels 22 24 of the mount 100, as desired. When the firearm 40 is positioned either on a right side of the mount 100, such as shown in FIG. 10, the lip 42 of the magwell 44 engages the left channel 24. When the firearm 40 is positioned on a left side of the mount 100, as shown in FIG. 11, the lip 42 engages the right channel 22. The size and shape of the channels 22 24 are designed to mate with and engage the lip 42 securely, preventing the firearm 40 from being knocked sideways out of the slot 20. Thus, the firearm 40 mounted to the mount 100 in FIG. 11 for instance, uses the lip-channel engagement, gravity, and a weight of the firearm 40 to keep it securely inside the mount 100.

Figure 2:
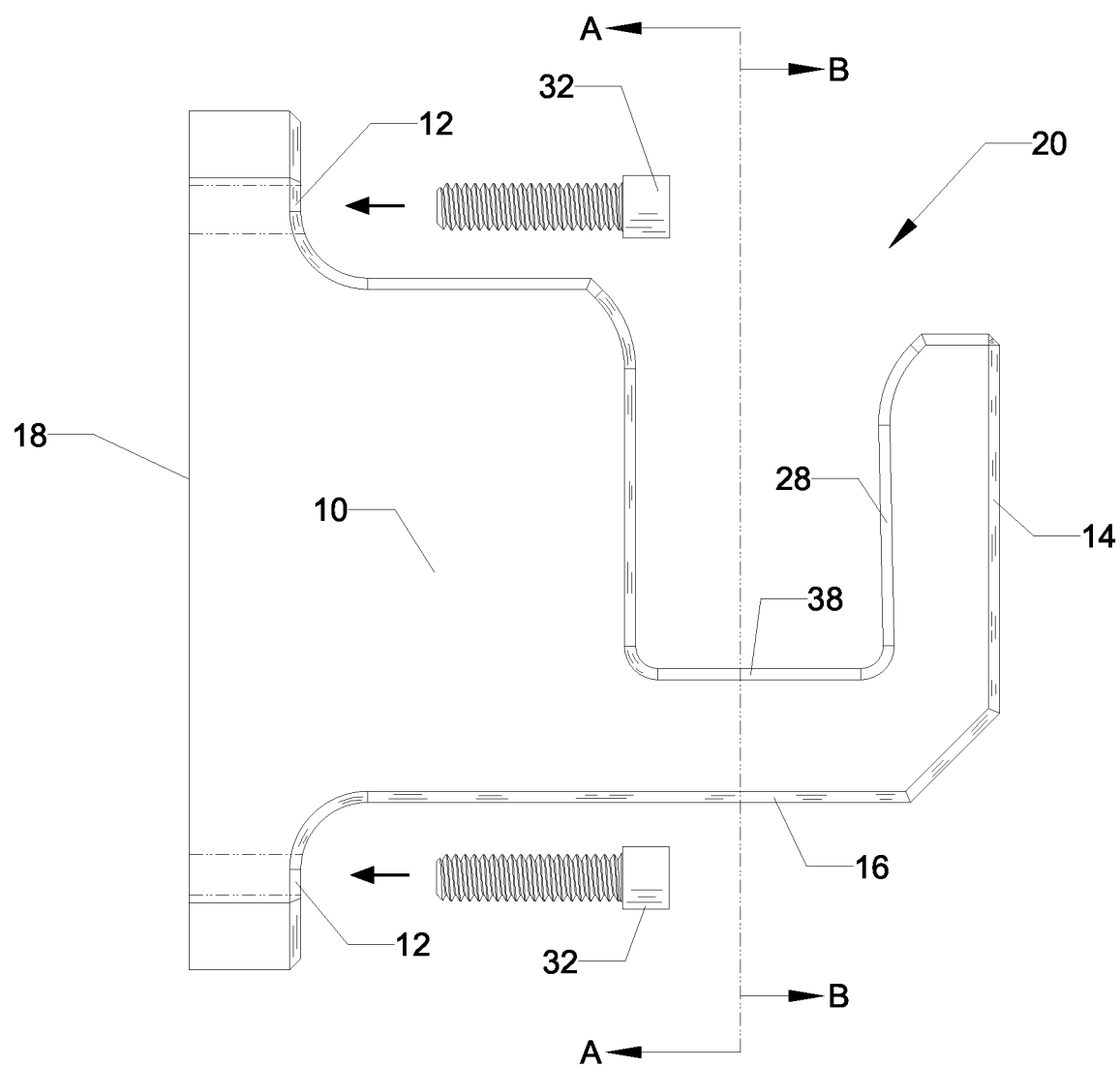
FIG. 2 is a side elevation view of the mount in FIG. 1.

Turning to FIGS. 1 and 2, the slot back wall 28 is joined to an elongated back face 18 by a sloping shoulder 30 joining an upper end of the back face 16 to an uppermost end of the slot back wall. The shoulder 30 is positioned so as to allow access to the aperture 12 formed into a flange of the back face 18. A bottom 16 has a first end adjoining a flange formed at a lower end of the back face 18 with a second end extending outwards and angling upwards at an approximately 45 degree angle to join a lowermost end of a front face 14 of the body 10, the front face 14 being an outer facing side of the slot front wall 28. The back face 18, as best shown in FIG. 2, has an upper flange and a lower flange, each flange formed with one or more apertures 12 sized and shaped to receive a fastener 30, shown in the FIGS. as a screw or other fastener appropriate for fastening the mount 100 to a wall surface (not shown). The FIGS. show the apertures 12 in two embodiments: in FIGS. 1-9, the upper flange and lower flange are each formed with a pair of apertures 12 for a total of 4 apertures used to secure the mount 100 to the wall surface. In FIGS. 10-11, the lower flange is shown with a single aperture 12, and the upper flange (not visible) is either formed with one or two apertures 12. The shoulder 30 and floor 16 allow the user easy access to the apertures 12 and fasteners 30. The inventor notes that the mount 100 can be fastened to the wall surface in a number of different ways, and the apertures 12 and elongated back face 18 in the representative embodiment in the FIGS. is not meant to limit fastening the mount 100 to the wall surface to just what is shown but is an example of one way to fasten the mount 100 securely. The inventor notes that when the firearm 40 is secured inside the mount 100, fasteners 30 and apertures 12 are not visible.

Figure 12:
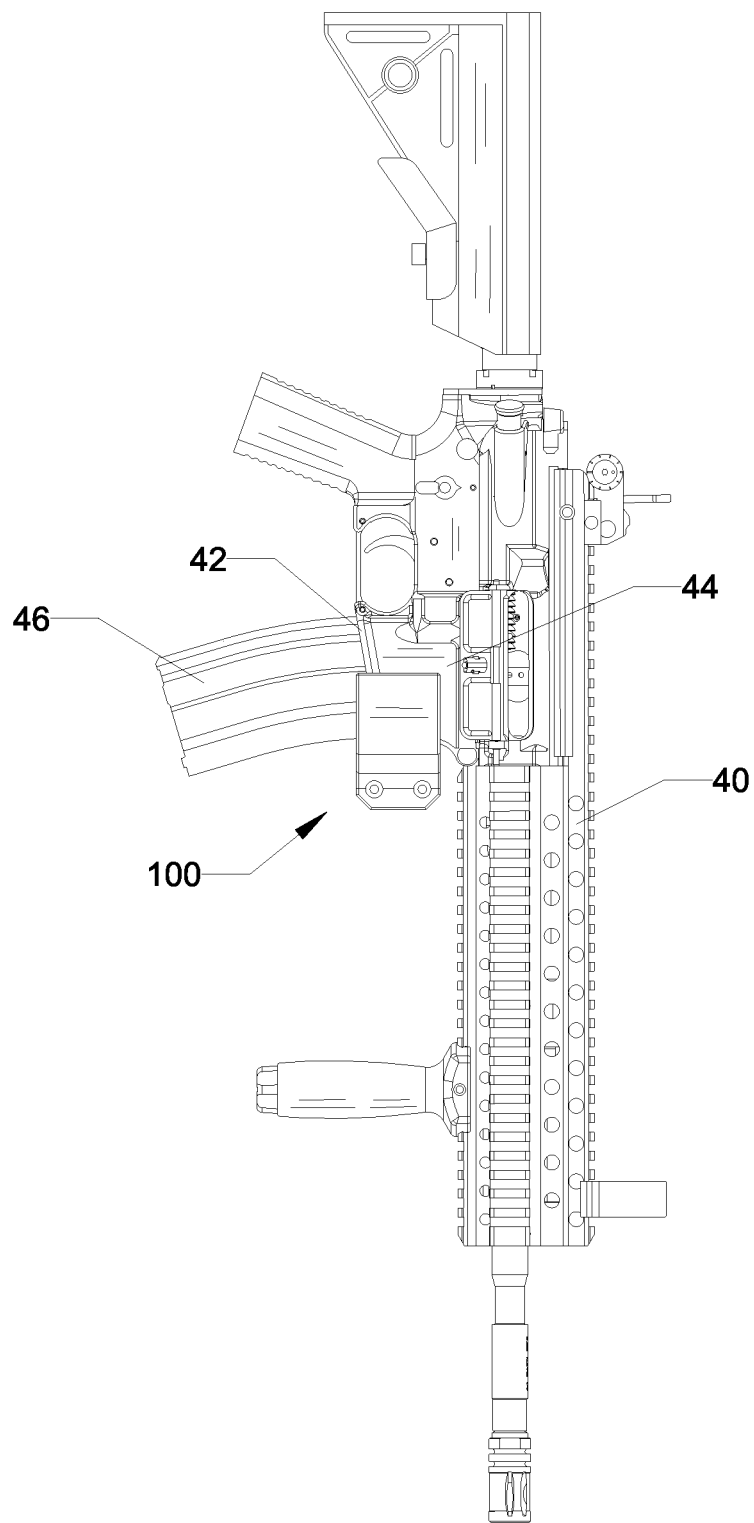
FIG. 12 is a front elevation view of the mount in FIG. 9 shown with the lip of the magwell of the AR-15 firearm engaging the left channel of the mount and with the AR-15 shown with a magazine installed in the magwell.
Figure 13:
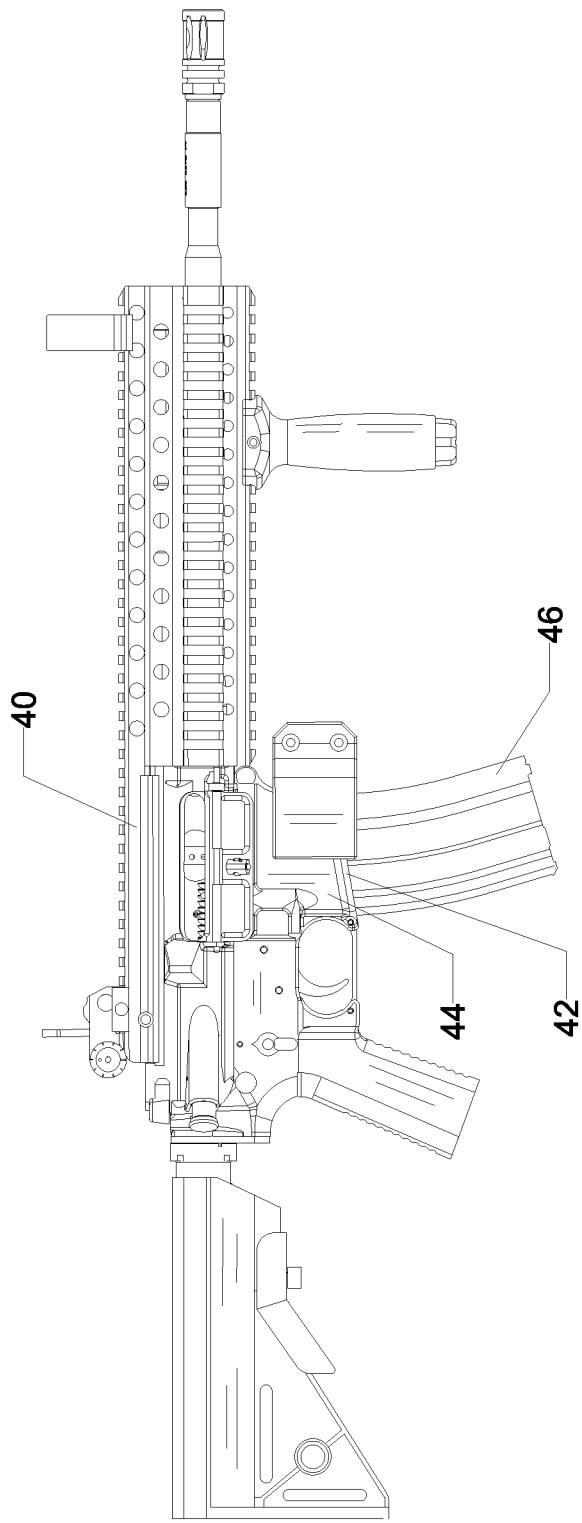
FIG. 13 is an alternative mounting position for the mount, shown rotated 90 degrees to the left and with the AR-15 shown engaging the mount by inserting the AR-15 sideways into a left facing slot opening.

FIG. 13 shows an alternative mounting position for the mount 100, where the body 10 is turned 90 degrees to the left of the mount position shown in FIG. 12, such that the slot 20 and its opening faces towards a left side, with the firearm 40 engaging the mount 100 with the magazine 46 facing downwards, towards a floor surface (not shown), and with the body of the firearm positioned above the mount 100. The firearm 40 thus engages and disengages the mount 100 by moving the front 44a of the magwell horizontally into and out of the slot 20. The mount 100 can also be oriented so that the slot 20 opens to the right side (not shown) and is similarly engaged and disengaged by pushing or pulling the firearm sideways into or out of the slot 20. The inventor notes that this alternative mounting position still securely holds the firearm 40 in the mount 100, however due care must be taken in places where there is foot traffic because the firearm 40 is more at risk of being dislodged when mounted horizontally. The alternative mounting position shown in FIG. 13 is most suitable in situations where there is limited vertical space to allow the firearm 40 to be lifted out of the mount 100, or in cases where the firearm owner has a disability or other physical constraint where accessing and storing the firearm is best achieved by moving the firearm 40 sideways, such as for firearm owners who are wheelchair bound or where there are height constraints and a sideways motion is best.

The mount 100 allows the firearm owner to securely store and display the firearm 40 with or without an attached magazine 46, and regardless of whether the magazine 46 is loaded or empty. The firearm 40 is easily removed by lifting upwards or sideways out of the mount 100 without the need to open latches, locks, or other locking means. The ease at which the firearm 40 is removed from the mount 100 solves a common problem with current firearm mount designs, which do not allow the firearm 40 to be easily or quickly removed from its mount, or which requires the magazine to be stored separately. The inventor notes that his mount 100 is especially useful for military barracks or other places where firearms must be easily retrievable and kept in a safe, use position, as well as for homeowners and business establishments which rely on firearms for safety and where there is no danger of unauthorized child access to such firearms. While the use of gun safes maximize safety, as does storing firearms separately from their ammunition, valuable time is wasted when the firearm is needed for security purposes, and this is a reason there are accidents, because the current storage means sacrifices convenience and the decorative nature of the firearm for safety. The mount 100 is designed to maximize ease of retrieval and secure storage of the firearm 40, while maximizing its decorative functionality. The inventor notes that the mount 100 must be responsibly used and does not advocate for careless storage where children may access stored and displayed firearms without adult supervision. The body 10 of the mount 100 has a minimalistic design and profile with a compact size and shape coupled with strength and security, allowing for discreet installations that minimize the look of the mount 100 without detracting from the beauty of the displayed and stored firearm 40.

The unitary body 10 of the mount is easy to manufacture, lightweight and easily customized. An identifier space 36 on the front face is ideal for a logo, name, or firearm specifications to allow the firearm owner to identify the exact mount 100 for which a removed firearm can be restored to its mount 100. The inventor notes that the mount 100 can be configured for most other rifles, pistols, and magazines to allow convenient and custom mounting options. The mount 100 can be made of any durable material, and in the representative embodiment shown in the FIGS., the mount 100 is made of PETG plastic. The mount 100 can be made using 3-D printing technology, as well as by injection molding. The representative embodiment is approximately 3.85 inches tall, 1.75 inches wide, and 3.63 inches deep and as shown in the FIGS., is shown with either four or two mounting apertures 12, with a minimum of 1 fastener positioned in an upper aperture 12 required for installation.

It is to be understood that the above-described arrangements are only illustrative of the application of the principles of the present invention. Numerous modifications and alternative arrangements may be devised by those skilled in the art without departing from the scope of the present invention. For instance, the channels 22 24 are arranged to allow the firearm 40 to be positioned left or right of the mount 100, but the inventors note that the channels 22 24 can also be configured to position the lip 42 on a right side of the mount 100 in the right channel 22, and a separate magazine on a left side of the mount 100, if for whatever reason the firearm owner does not wish to store the magazine installed in the magwell prior to storage in the mount 100. Left and right channels can also be configured differently, allowing a same mount 100 to display one type of firearm in the left channel and a different type of firearm in the right channel, or include more than 2 channels with different channel profiles to allow a variety of different firearms to be mounted thereto.

The front face 14 and slot front wall 38 are currently shown in the FIGS. as being slightly shorter than the slot back wall 26 and shoulder 30, however the inventor notes that relative heights and/or widths of the walls 26 28 of the slot 20 can be a same height and/or width, or other widths and/or heights. The shape of the body 10, slot 20 and channels 22 24 can be any suitable shape so long as the slot 20 and the channels 22 24 are functional to mate with the lip 42. The inventor notes that the ability to customize the identifier 36 allows the firearm owner an easy way to catalogue and identify stored firearms, but another way to visually identify a particular firearm's mount is to vary a shape of the slot front wall 38 and the front face 14 of the body 10. These variations can be functional or purely decorative.

The inventor notes that one of the drawbacks of single mounts over wall systems with rails with predetermined spacing is that the mount 100 still requires some measuring and planning to ensure a level and pleasing position of the displayed firearm on the wall surface. Hence, a small level can be incorporated into the body 10, such as on the shoulder 30 or the upper end of the back face 18 to facilitate installation and allow the mount 100 to remain visually unobtrusive.

I claim:

1. A wall mount for receiving a protruding lip formed along an exterior perimeter of an opening of a magazine well of a firearm, the wall mount comprising:
    a body having a U-shaped slot defined by a slot back wall inscribed with a back channel, a slot floor, and a slot front wall inscribed with a front channel;
    wherein the U-shaped slot is further comprised of an opening sized and shaped to receive a front side of the magazine well of the firearm; and
    wherein the front and back channels are aligned so that both the front and back channels receive the protruding lip of the magazine well when the magazine well of the firearm is positioned inside the slot,
    whereby the protruding lip engages the front and back channels to prevent rotation of the magazine well within the slot so as to maintain an upright position of the magazine well.

2. The wall mount in claim 1, wherein the mount receives the magazine well and protruding lip of an Armalite 15 rifle.

3. The wall mount in claim 1, wherein the mount body is made of plastic.

4. The wall mount in claim 1, further comprising an elongated back face on a wall adjacent side of the body, the back face formed with an aperture sized and shaped to receive a threaded fastener.

5. The wall mount in claim 4, wherein the body further comprises a shoulder, and wherein the shoulder joins an upper wall end of the slot back wall to the back face.

6. The wall mount in claim 4, wherein the aperture is formed at an upper end of the back face and a second aperture is formed on a lower end of the back face.

7. The wall mount in claim 4, wherein the body is further comprised of a bottom having a first end and a second end;
    wherein the slot front wall is further comprised of an opposed front face; and
    wherein the back face adjoins the bottom at the first end; and
    wherein the second end extends away from the first end and angles upwards adjoining a lowermost end of the front face.

8. The wall mount in claim 1, wherein the front channel and the back channel of the U-shaped slot are further comprised of a left channel and a right channel inscribed therein, disposed in parallel but divergent arrangement along the slot back wall and the slot front wall, and in parallel arrangement along the slot floor; and
    the protruding lip of the magazine well is positioned inside either the right channel or the left channel when the firearm engages the wall mount.

9. The wall mount in claim 8 wherein the left channel or the right channel has a concave profile.

10. The wall mount in claim 8, wherein the left channel or the right channel is sized and shaped to slideably mate with the protruding lip of the magazine well.

11. The wall mount in claim 8, wherein the protruding lip of the magazine well is positioned into the left channel of the U-shaped slot when an opening of the U-shaped slot is positioned upwards and the firearm is positioned to a right side of the mount with the opening of the magazine well facing a left side of the mount.

12. The wall mount in claim 8, wherein the protruding lip of the magazine well is positioned into the right channel of the slot when the opening of the slot is positioned upwards and the firearm is positioned on a left side of the wall mount.

13. The wall mount in claim 8, wherein either the left channel, the right channel or both the left channel and the right channel are continuous across the slot back wall, the slot floor, and the slot front wall.

14. The wall mount in claim 1, wherein the mount receives the magazine well and protruding lip of a pistol.

15. A method of mounting a firearm with a protruding lip formed along an exterior perimeter of an opening of a magazine well of a firearm to a wall surface using a wall mount having a U-shaped slot inscribed therein with a pair of parallel but divergent channels sized and shaped to receive the protruding lip and an opening of the U-shaped slot sized and shaped to receive the magazine well, the method comprising the steps of:
 orienting the opening of the U-shaped slot of the wall mount so as to face either upwards or sideways;
 fastening the wall mount to the wall surface;
 orienting a front of the magazine well towards the opening of the U-shaped slot; and
 sliding the protruding lip into one of the channels of the pair of channels.

16. The method in claim 15, wherein the pair of channels are further comprised of a left channel and a right channel, and wherein the step of orienting the opening is further comprised of:
 orienting the opening of the U-shaped slot towards a right side; and
 wherein the step of sliding is further comprised of:
 sliding the protruding lip into the left channel.

17. The method in claim 15, wherein the pair of channels are further comprised of a left channel and a right channel, and wherein the step of orienting the opening is further comprised of:
 orienting the opening of the U-shaped slot towards a left side; and
 wherein the step of sliding is further comprised of:
 sliding the protruding lip into the right channel.

* * * * *